US012420737B2

(12) United States Patent
Minami et al.

(10) Patent No.: US 12,420,737 B2
(45) Date of Patent: Sep. 23, 2025

(54) CURTAIN AIRBAG DEVICE

(71) Applicant: ASHIMORI INDUSTRY CO., LTD., Osaka (JP)

(72) Inventors: Yuta Minami, Osaka (JP); Tetsuro Hamada, Osaka (JP); Masanori Kato, Osaka (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 18/594,823

(22) Filed: Mar. 4, 2024

(65) Prior Publication Data

US 2024/0317171 A1  Sep. 26, 2024

(30) Foreign Application Priority Data

Mar. 20, 2023  (JP) ................................. 2023-044429

(51) Int. Cl.
*B60R 21/232* (2011.01)
*B60R 21/213* (2011.01)
*B60R 21/233* (2006.01)

(52) U.S. Cl.
CPC .......... *B60R 21/232* (2013.01); *B60R 21/213* (2013.01); *B60R 2021/23316* (2013.01)

(58) Field of Classification Search
CPC ... B60R 21/213; B60R 21/232; B60R 21/233; B60R 2021/23316
See application file for complete search history.

(56) References Cited

U.S. PATENT DOCUMENTS

| 6,382,669 | B2* | 5/2002 | Tanabe | B60R 21/235 |
| | | | | 280/743.1 |
| 6,932,386 | B2* | 8/2005 | Ikeda | B60R 21/276 |
| | | | | 280/739 |
| 7,159,895 | B2* | 1/2007 | Aoki | B60R 21/232 |
| | | | | 280/730.2 |
| 7,163,233 | B2* | 1/2007 | Kino | B60R 21/2338 |
| | | | | 280/730.2 |

(Continued)

FOREIGN PATENT DOCUMENTS

| JP | 2011-255714 A | 12/2011 |
| JP | 2014151661 A * | 8/2014 |

(Continued)

*Primary Examiner* — Laura Freedman
(74) *Attorney, Agent, or Firm* — Sughrue Mion, PLLC

(57) ABSTRACT

A curtain airbag device includes an airbag including, on one end side in a vehicle front-rear direction, an inflation portion configured to be inflated by a gas, and a non-inflation region into which the gas does not flow. In a state where the airbag is inflated and deployed, the non-inflation region covers a part of an opening among the plurality of openings, and the inflation portion is disposed to surround the non-inflation region, the opening being located at endmost in a vehicle longitudinal direction. In a case where an impactor strikes the opening located at the endmost, the impactor comes into contact with the non-inflation region, and a lower inflation portion of the inflation portion is sandwiched between a lower end of the impactor and the interior materials of the vehicle side portion, the lower inflation portion being located on a vehicle lower side of the non-inflation region.

8 Claims, 7 Drawing Sheets

(56) References Cited

U.S. PATENT DOCUMENTS

| | | | |
|---|---|---|---|
| 7,278,655 B2 * | 10/2007 | Inoue | B60R 21/2342 280/730.2 |
| 7,322,600 B2 * | 1/2008 | Inoue | B60R 21/232 280/730.2 |
| 7,325,826 B2 * | 2/2008 | Noguchi | B60R 21/232 280/730.2 |
| 7,703,798 B2 * | 4/2010 | Yamagiwa | B60R 21/232 280/730.2 |
| 7,731,224 B2 * | 6/2010 | Enriquez | B60R 21/201 280/730.2 |
| 7,731,227 B2 * | 6/2010 | Hotta | B60R 21/217 280/730.2 |
| 7,766,378 B2 * | 8/2010 | Miura | B60R 21/232 280/730.2 |
| 7,789,418 B2 * | 9/2010 | Wipasuramonton | B60R 21/2346 280/730.2 |
| 7,810,838 B2 * | 10/2010 | Iwayama | B60R 13/025 280/730.2 |
| 7,963,552 B2 * | 6/2011 | Tanaka | B60R 21/232 280/736 |
| 7,988,187 B2 * | 8/2011 | Yamamura | B60R 21/232 280/730.2 |
| 8,025,308 B2 * | 9/2011 | Fletcher | B60R 21/232 280/730.2 |
| 8,360,467 B2 * | 1/2013 | Sato | B60R 21/233 280/730.2 |
| 8,573,638 B2 * | 11/2013 | Hayashi | B60R 21/214 280/730.2 |
| 8,579,322 B2 * | 11/2013 | Saimura | B60R 21/233 280/730.2 |
| 8,789,845 B2 * | 7/2014 | Kato | B60R 21/2346 280/730.2 |
| 8,807,595 B2 * | 8/2014 | Nakamura | B60R 21/233 280/730.2 |
| 8,882,139 B2 * | 11/2014 | Kawamura | B60R 21/233 280/730.2 |
| 9,126,558 B2 * | 9/2015 | Kawamura | B60R 21/213 |
| 9,211,863 B2 * | 12/2015 | Kashio | B60R 21/23138 |
| 9,566,935 B2 * | 2/2017 | Hicken | B60R 21/2338 |
| 9,862,349 B2 * | 1/2018 | Fujiwara | B60R 21/237 |
| 9,908,499 B2 * | 3/2018 | Low | B60R 21/233 |
| 9,994,187 B2 * | 6/2018 | Okuhara | B60R 21/232 |
| 10,836,342 B2 * | 11/2020 | Hayashi | B60R 21/213 |
| 2006/0208466 A1 * | 9/2006 | Kirby | B60R 21/232 280/730.2 |
| 2011/0298200 A1 | 12/2011 | Taniguchi et al. | |
| 2015/0314746 A1 * | 11/2015 | Okuhara | B60R 21/20 280/728.2 |
| 2015/0336531 A1 | 11/2015 | Kawamura et al. | |
| 2016/0039384 A1 | 2/2016 | Fukawatase et al. | |

FOREIGN PATENT DOCUMENTS

| | | | |
|---|---|---|---|
| JP | 2014166797 A | * | 9/2014 |
| JP | 2014166798 A | * | 9/2014 |
| JP | 2014184861 A | * | 10/2014 |
| JP | 2015140087 A | * | 8/2015 |
| JP | 2016-37240 A | | 3/2016 |
| JP | 2017-43319 A | | 3/2017 |
| WO | 2014/132513 A1 | | 9/2014 |
| WO | 2014/208256 A1 | | 12/2014 |

* cited by examiner

CURTAIN AIRBAG DEVICE

CROSS-REFERENCE TO RELATED APPLICATIONS

This application is based on and claims priority under 35 USC 119 from Japanese Patent Application No. 2023-044429 filed on Mar. 20, 2023, the entire content of which is incorporated herein by reference.

TECHNICAL FIELD

The present disclosure relates to a curtain airbag device. More specifically, the present disclosure relates to a curtain airbag device to be attached to a roof side rail of a vehicle such as an automotive vehicle, and to be inflated and deployed from above to below a vehicle side wall to protect occupants in an emergency of the vehicle.

BACKGROUND ART

A curtain airbag device is a device that is stored in a space or the like between a roof side rail and a ceiling material. The curtain airbag device is configured to deploy, into an interior of a vehicle cabin (hereinafter, also simply referred to as "vehicle interior"), an airbag inflated by introduction of gas in order to protect occupants in an emergency such as a side collision of a vehicle.

In a rollover test specified in FMVSS 226, which is a regulation of the United States, an opening (side window or the like) having a size through which a head of an occupant passes should be covered with an airbag of a curtain airbag device such that the head of the occupant does not pass through when a head impactor corresponding to the head of the occupant is applied.

For example, in a curtain airbag device described in WO 2014/208256 A1, a non-inflation region having a relatively large range is provided in an intermediate portion of a vehicle in a front-rear direction, and in a case where an occupant is ejected to an exterior of a vehicle cabin (hereinafter, also simply referred to as "vehicle exterior"), the occupant is supported by a center pillar, such that a capacity of a curtain airbag is reduced while satisfying vehicle exterior ejection prevention performance.

Further, in the rollover test, in the opening located at endmost in a vehicle longitudinal direction, there is less space to support the airbag, making it difficult to restrain the airbag, resulting in an increase in a movement amount of the impactor.

On the other hand, in an airbag device described in WO 2014/132513 A1, a lower end of an airbag is extended to cover a door trim side surface, and the airbag is supported by the door trim side surface.

However, in the airbag device described in WO 2014/132513 A1, the capacity of the airbag is increased by an amount corresponding to extension of the lower end of the airbag. Further, in the curtain airbag device described in WO 2014/208256 A1, as a distance from the center pillar increases, the vehicle exterior ejection prevention performance decreases, and a vehicle exterior ejection amount of the occupant tends to increase. Therefore, by providing a large inflation portion without providing a non-inflation region, the occupant is restrained early and the vehicle exterior ejection amount is reduced.

SUMMARY OF INVENTION

Aspect of non-limiting embodiments of the present disclosure relates to provide a curtain airbag device capable of exhibiting vehicle exterior ejection prevention performance while reducing a capacity of an airbag.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to a first aspect of the present disclosure, there is provided a curtain airbag device to be attached to a roof side rail of a vehicle, and to be inflated and deployed to cover a plurality of openings partitioned by the roof side rail and interior materials of a vehicle side portion, the curtain airbag device including:
  an inflator configured to generate gas;
  an airbag including, on one end side in a vehicle front-rear direction:
    an inflation portion configured to be inflated by the gas; and
    a non-inflation region into which the gas does not flow; and
  at least one fixing member located on an upper portion of the airbag, the fixing member being configured to fix the airbag to the roof side rail,
  in which, in a state where the airbag is inflated and deployed, the non-inflation region covers a part of an opening among the plurality of openings, and the inflation portion is disposed to surround the non-inflation region, the opening being located at endmost in a vehicle longitudinal direction, and
  in a case where an impactor strikes the opening located at the endmost, the impactor comes into contact with the non-inflation region, and a lower inflation portion of the inflation portion is sandwiched between a lower end of the impactor and the interior materials of the vehicle side portion, the lower inflation portion being located on a vehicle lower side of the non-inflation region.

According to a second aspect of the present disclosure, there is provided a curtain airbag device to be attached to a roof side rail of a vehicle, and to be inflated and deployed to cover a plurality of openings partitioned by the roof side rail and interior materials of a vehicle side portion, the curtain airbag device including:
  an inflator configured to generate gas;
  an airbag including, on one end side in a vehicle front-rear direction:
    an inflation portion configured to be inflated by the gas; and
    a non-inflation region into which the gas does not flow; and
  at least one fixing member located on an upper portion of the airbag, the fixing member being configured to fix the airbag to the roof side rail,
  in which, in a state where the airbag is inflated and deployed, the non-inflation region covers a part of an opening among the plurality of openings, and the inflation portion is disposed to surround the non-inflation region, the opening being located at endmost in a vehicle longitudinal direction,
  in a case where an impactor strikes the opening located at the endmost, the impactor comes into contact with the non-inflation region, and
  in a state where the airbag is deployed and is not inflated, a length, in a vehicle vertical direction, of a lower inflation portion of the inflation portion is 15% or more of a length, in the vehicle vertical direction, of the opening located at the endmost, the lower inflation portion being located on a vehicle lower side of the non-inflation region.

According to a third aspect of the present disclosure, there is provided a curtain airbag device to be attached to a roof side rail of a vehicle, and to be inflated and deployed to cover a plurality of openings partitioned by the roof side rail and interior materials of a vehicle side portion, the curtain airbag device including:

an inflator configured to generate gas;

an airbag including, on one end side in a vehicle front-rear direction:

an inflation portion configured to be inflated by the gas; and a non-inflation region into which the gas does not flow; and at least one fixing member located on an upper portion of the airbag, the fixing member being configured to fix the airbag to the roof side rail, in which, in a state where the airbag inflates and deploys, the non-inflation region covers a part of an opening among the plurality of openings, and the inflation portion is disposed to surround the non-inflation region, the opening being located at endmost in a vehicle longitudinal direction, in a case where an impactor strikes the opening located at the endmost, the impactor comes into contact with the non-inflation region, and the inflation portion includes, closer to an end than the non-inflation region, a stopper portion bent and sandwiched between opposing edge portions, in a vehicle vertical direction, of the interior materials, and in a state where the airbag is inflated and deployed and before the impactor strikes, a length, in the vehicle vertical direction, of the stopper portion is longer than a distance, in the vehicle vertical direction, between the opposing edge portions of the interior materials.

BRIEF DESCRIPTION OF DRAWINGS

Exemplary embodiment(s) of the present invention will be described in detail based on the following figures, wherein.

DESCRIPTION OF EMBODIMENTS

Hereinafter, an embodiment of a curtain airbag device according to the present disclosure will be described with reference to the drawings.

Figure 1:
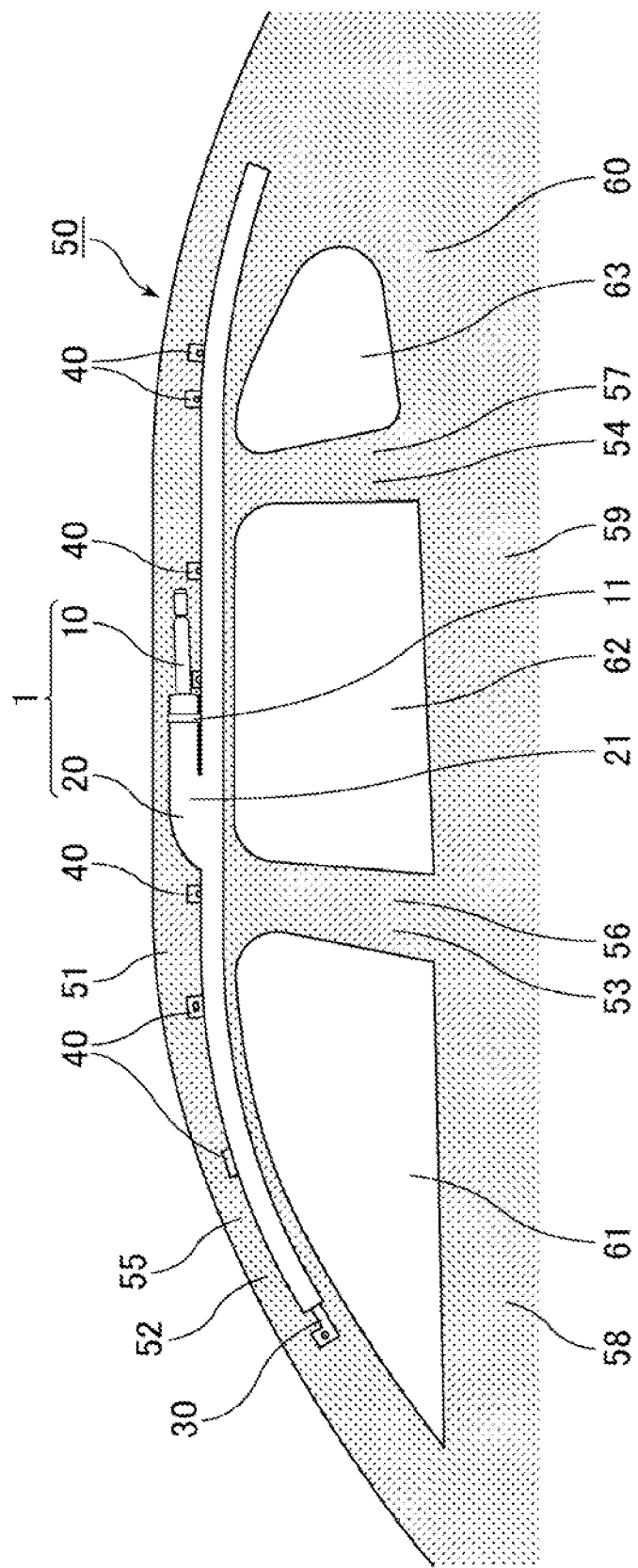
FIG. 1 schematically illustrates an initial state of an embodiment of a curtain airbag device attached to a vehicle, and is a front view of a vehicle side wall from a vehicle interior side.

FIG. 1 schematically illustrates an initial state of the embodiment of the curtain airbag device attached to a vehicle, and is a front view of a vehicle side wall from a vehicle interior side. The "initial state" means a state before the airbag 20 starts to inflate and deploy.

As illustrated in FIG. 1, a side wall of a vehicle 50 includes a plurality of pillars such as a front pillar (A pillar) 52 at front of the vehicle, a center pillar (B pillar) 53 at a center of the vehicle, and a rear pillar (C pillar) 54 at rear of the vehicle, and a roof side rail 51 located between at least the plurality of pillars and at an upper part of the vehicle. The curtain airbag device 1 is attached to the roof side rail 51. The curtain airbag device 1 in the initial state is stored in a space, which is a storage portion of the vehicle side wall, formed between the side wall on the vehicle interior side of the vehicle 50 and interior materials, and cannot be visually recognized by an occupant inside a vehicle. The interior materials are members that cover the side wall on the vehicle interior side of the vehicle 50. Examples of the interior materials include a ceiling material that covers the roof side rail 51, a front pillar trim 55 that covers the front pillar 52, a center pillar trim 56 that covers the center pillar 53, a rear pillar trim 57 that covers the rear pillar 54, a front door trim 58 provided on a front door located between the front pillar 52 and the center pillar 53, a rear door trim 59 provided on a rear door located between the center pillar 53 and the rear pillar 54, and a trunk side trim 60 located outside a trunk in a vehicle width direction.

The curtain airbag device 1 includes an inflator 10 configured to generate gas, an airbag (curtain airbag) 20, a restriction member (tether) 30, and a plurality of fixing members 40.

The inflator 10 is a cylindrical (columnar) gas generator, and includes a gas ejection hole at one end in a vehicle front-rear direction. The gas ejection hole is inserted into a gas introduction portion 21 of the airbag 20 sewed in a tubular shape. Gas generated by the inflator 10 is introduced into the airbag 20 from the gas ejection hole of the inflator 10, through the gas introduction portion 21 of the airbag 20. The gas introduction portion 21 is fastened by a band 11 together with the inserted inflator 10 such that the gas does not leak out. The inflator 10 is attached to the roof side rail 51 above the center pillar 53. The gas introduction portion 21 of the airbag 20 is located at an upper edge, which is an upper end in a vehicle height direction, of the airbag 20. Since the gas introduction portion 21 is located in the center of the vehicle or a vicinity of the center of the vehicle 50 in the front-rear direction, a flow of gas from in the center of the vehicle or the vicinity of the center of the vehicle 50 in the front-rear direction toward a front end and a flow of gas from the vicinity of the center of the vehicle 50 in the front-rear direction toward a rear end are generated inside the airbag 20.

The inflator 10 is configured to be activated in an emergency of the vehicle 50. For example, in a case where a collision detection sensor mounted on the vehicle 50 detects a side collision or an oblique collision of the vehicle 50, an electronic control unit (ECU) calculates a signal sent from the collision detection sensor to determine a collision level. In a case where the determined collision level corresponds to a case in which the airbag 20 is inflated, the inflator 10 is ignited, and gas is generated by a chemical reaction due to combustion.

A type of the inflator 10 is not particularly limited, and examples thereof include a pyro-type inflator using gas generated by combusting a gas generating agent, a stored inflator using compressed gas, and a hybrid inflator using mixed gas of gas generated by combusting a gas generating agent and compressed gas.

Figure 2:
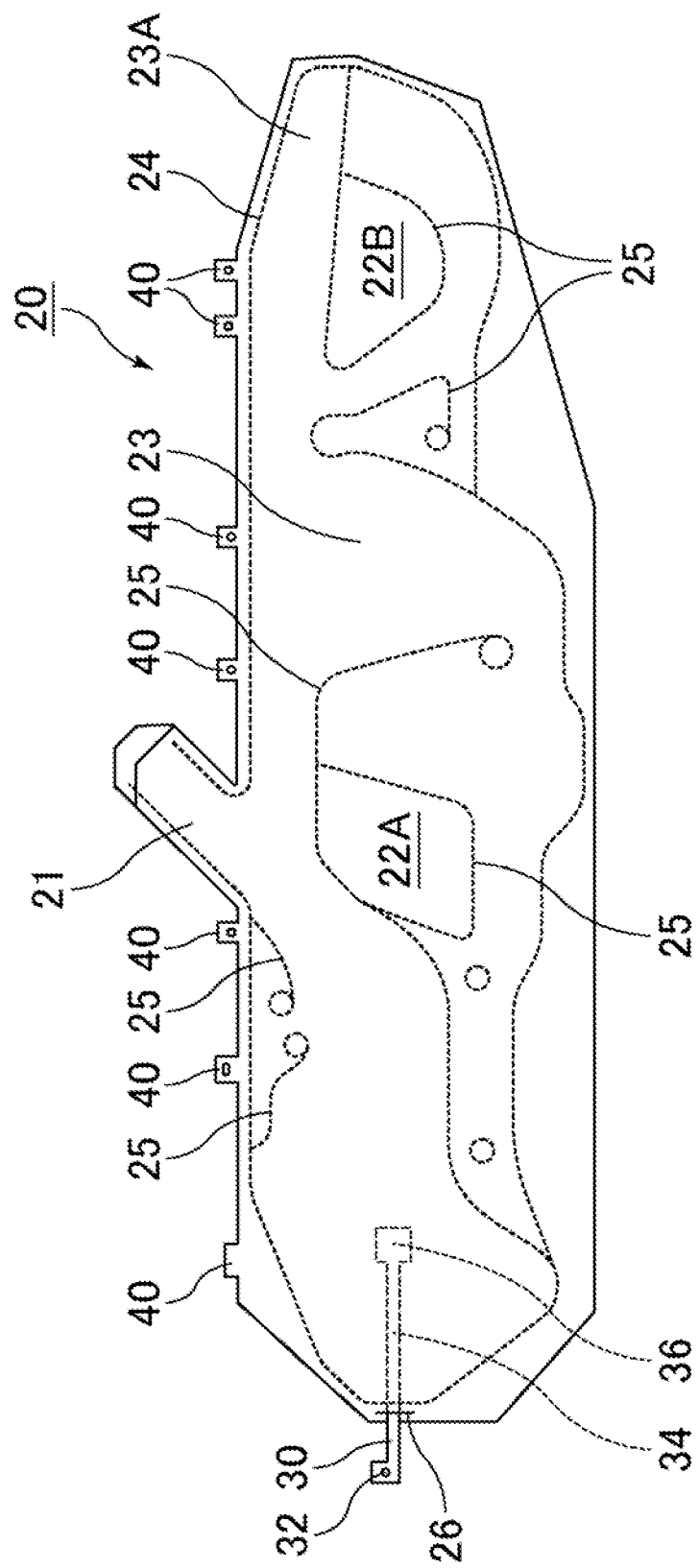
FIG. 2 is a diagram schematically illustrating a deployed state of an airbag included in the curtain airbag device in FIG. 1.

FIG. 2 is a diagram schematically illustrating a deployed state of an airbag included in the curtain airbag device in FIG. 1. FIG. 2 illustrates a state in which the airbag 20 is deployed without being inflated.

The airbag 20 has a planar shape illustrated in FIG. 2. The airbag 20 includes a bag-shaped protection inflation portion 23 configured to be inflated by being filled inside with gas. The fixing member 40 is provided on an upper portion of the airbag 20 (on a vehicle upper side of the airbag 20), and is used to attach the roof side rail 51 or the like to the vehicle side wall. In the initial state, the airbag 20 is folded, and a wrapping material (not illustrated) that can be ruptured when inflated is wound around the airbag 20, such that the airbag 20 is formed into a rod shape illustrated in FIG. 1. The rod-shaped airbag 20 is attached to the front pillar 52 and the roof side rail 51, and is stored in the storage portion of the vehicle side wall. In the emergency of the vehicle 50, the gas generated by the inflator 10 is filled into the protection inflation portion 23, such that the airbag 20 is inflated and unfolded. Then, in a case where the interior materials are pushed open by a pressure of the inflated airbag 20, the airbag 20 descends into the vehicle interior, further inflates, deploys in a curtain shape toward a lower side of the vehicle 50 along the side wall of the vehicle interior, and takes the shape illustrated in FIG. 2.

Figure 3:
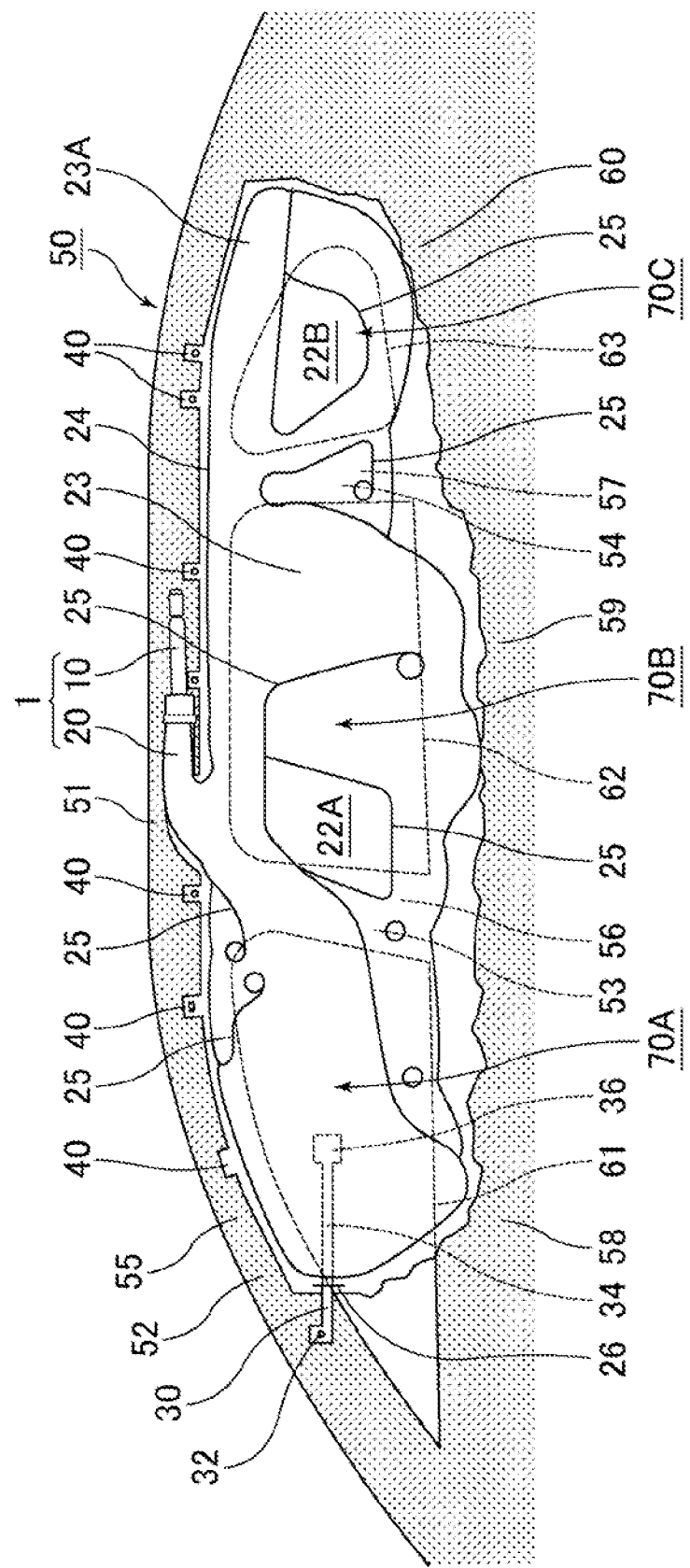
FIG. 3 schematically illustrates an inflated and deployed state of the airbag included in the curtain airbag device in FIG. 1, and is a front view of the vehicle side wall from the vehicle interior side.

FIG. 3 schematically illustrates an inflated and deployed state of the airbag included in the curtain airbag device in FIG. 1, and is a front view of the vehicle side wall from the vehicle interior side.

As illustrated in FIG. 3, the curtain airbag device 1 is configured to be inflated and deployed to cover a plurality of openings 70A, 70B, and 70C partitioned by the roof side rail 51 and the interior materials of a vehicle side portion. That is, the inflated and deployed airbag 20 covers the side wall and the side window from the vehicle interior side, along the front-rear direction of the vehicle 50. Accordingly, the occupant in the vehicle interior is protected, with a focus on a head of the occupant. The airbag 20 completes inflation and deployment approximately 70 milliseconds after the inflator 10 is ignited, and thereafter maintains the inflated and deployed state.

The opening 70A is partitioned by the roof side rail 51, the front pillar trim 55, the center pillar trim 56, and the front door trim 58. The opening 70B is partitioned by the roof side rail 51, the center pillar trim 56, the rear pillar trim 57, and the rear door trim 59. The opening 70C is partitioned by the roof side rail 51, the rear pillar trim 57, and the trunk side trim 60. The opening 70A is an opening region of a front side window 61. The opening 70B is an opening region of a rear side window 62. The opening 70C is an opening region of a quarter window 63. Each window may have a structure that can be opened and closed, or a structure that cannot be opened and closed.

In the airbag 20, the bag-shaped protection inflation portion 23 is formed by joining overlapped base fabrics at an outer peripheral joint portion 24. The base fabric can be made of threads such as nylon 66 or polyethylene terephthalate (PET), for example. Further, a surface of the base fabric may be coated with silicon or the like, in order to improve heat resistance and airtightness. The overlapped base fabric may be two base fabrics independent of each other, or may be facing portions of the same base fabric produced by folding one base fabric in two.

The outer peripheral joint portion 24 is a portion in which the base fabrics are joined in an annular shape except for the gas introduction portion 21 to form the bag-shaped protection inflation portion 23 having airtightness. The outer peripheral joint portion 24 defines an outer edge shape of the protection inflation portion 23. In the present disclosure, a joining method is not particularly limited, and examples thereof include sewing, adhesion, welding, and combinations thereof. Since airtightness and joining strength are required for joining of the outer peripheral joint portion 24, it is preferable to use both sewing and adhesion.

Further, in a region surrounded by the outer peripheral joint portion 24, a joint portion 25 may be provided in which the base fabrics facing each other on front and back sides are joined to each other. By providing the joint portion 25, a thickness of the protection inflation portion 23 in the vehicle width direction at the time of inflation can be partially reduced, and an inflation shape of the protection inflation portion 23 can be controlled.

The airbag 20 includes a plurality of non-inflation regions 22A, 22B into which the gas generated by the inflator 10 does not flow. Accordingly, an internal capacity of the protection inflation portion 23 can be reduced. Each of the non-inflation regions 22A, 22B is formed by annularly joining the overlapped base fabrics at the joint portion 25.

Further, the airbag 20 includes, on one end side in the vehicle front-rear direction, an inflation portion 23A, which is a part of the protection inflation portion 23, and the non-inflation region 22B. Here, the one end side is a rear end side in the vehicle front-rear direction. The protection inflation portion 23 includes a plurality of air chambers (chambers). The inflation portion 23A corresponds to an air chamber located at a rearmost position in the vehicle front-rear direction, among the plurality of air chambers.

The plurality of fixing members (tabs) 40 are provided on an upper portion of the protection inflation portion 23 to protrude from the upper edge of the airbag 20. The fixing members 40 are fixed to the roof side rail 51 and the front pillar 52, using bolts or clips.

The restriction member 30 is a band-shaped or string-shaped member configured to restricts a position and the inflation shape of the protection inflation portion 23 in a case where the protection inflation portion 23 is inflated and deployed from the roof side rail 51 toward a lower side of the vehicle interior due to inflow of the gas generated by the inflator 10. The restriction member 30 is wrapped in the folded protection inflation portion 23, in the initial state. One end 32 of the restriction member 30 is fixed to the front pillar 52. The other end 36 of the restriction member 30 is fixed to a portion of the protection inflation portion 23 located on a vehicle front side. An intermediate portion 34 of the restriction member 30 is inserted into an opening (slit) 26, which is provided to communicate with an inside of the air chamber included in the protection inflation portion 23, to be movable in the vehicle front-rear direction. The opening 26 is formed to penetrate the base fabric at a position away from the air chamber.

A material of the restriction member 30 is not particularly limited, but a material that has high strength and is difficult to stretch is preferable. As the material of the restriction member 30, for example, a silicone-coated cloth formed by subjecting a surface of a cloth woven with threads of nylon 66, polyethylene terephthalate (PET), or the like to a silicone treatment is used.

Next, a relation between the inflated and deployed state of the airbag 20 in the curtain airbag device 1 according to the embodiment and an impactor will be described in more detail with reference to FIG. 4 to FIG. 11.

Figure 4:
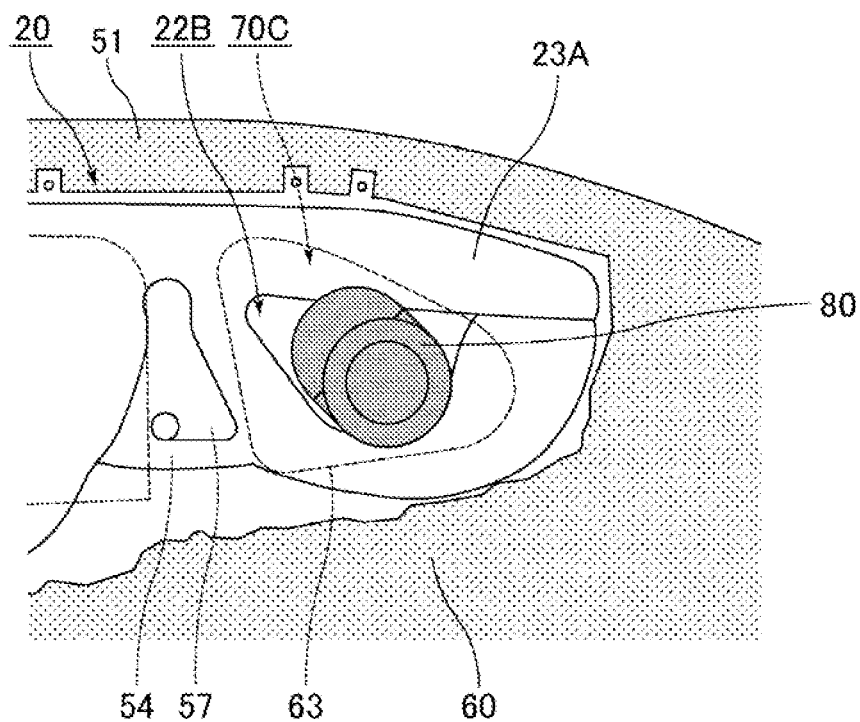
FIG. 4 schematically illustrates an inflated and deployed state of the airbag, before an impactor strikes, included in the curtain airbag device in FIG. 1 in a vehicle rear portion, and is a front view of the vehicle side wall from the vehicle interior side.

FIG. 4 schematically illustrates an inflated and deployed state of the airbag, before the impactor strikes, included in the curtain airbag device in FIG. 1 in a vehicle rear portion, and is a front view of the vehicle side wall from the vehicle interior side.

As illustrated in FIG. 4, in the inflated and deployed state of the airbag 20, the non-inflation region 22B covers a part of the opening 70C located at endmost in a vehicle longitudinal direction, among the plurality of openings 70A, 70B, and 70C. Here, the endmost in a vehicle longitudinal direction is a rearmost end in the vehicle front-rear direction. That is, in a state in which the vehicle side wall is viewed from the vehicle interior side, the non-inflation region 22B has a triangular shape or a trapezoidal shape, and overlaps only a part of the opening 70C.

The opening 70C has a size through which the head of the occupant passes. The opening 70C is located at the rear of the vehicle with respect to a second row of seats of the vehicle. Here, the opening 70C is located on an outside in the vehicle width direction with respect to a third row of seats of the vehicle.

Further, in the inflated and deployed state of the airbag 20, the inflation portion 23A is disposed to surround the non-inflation region 22B. That is, the inflation portion 23A is located on a vehicle upper side, a vehicle lower side, a vehicle front side, and a vehicle rear side of the non-inflation region 22B.

Figure 5:
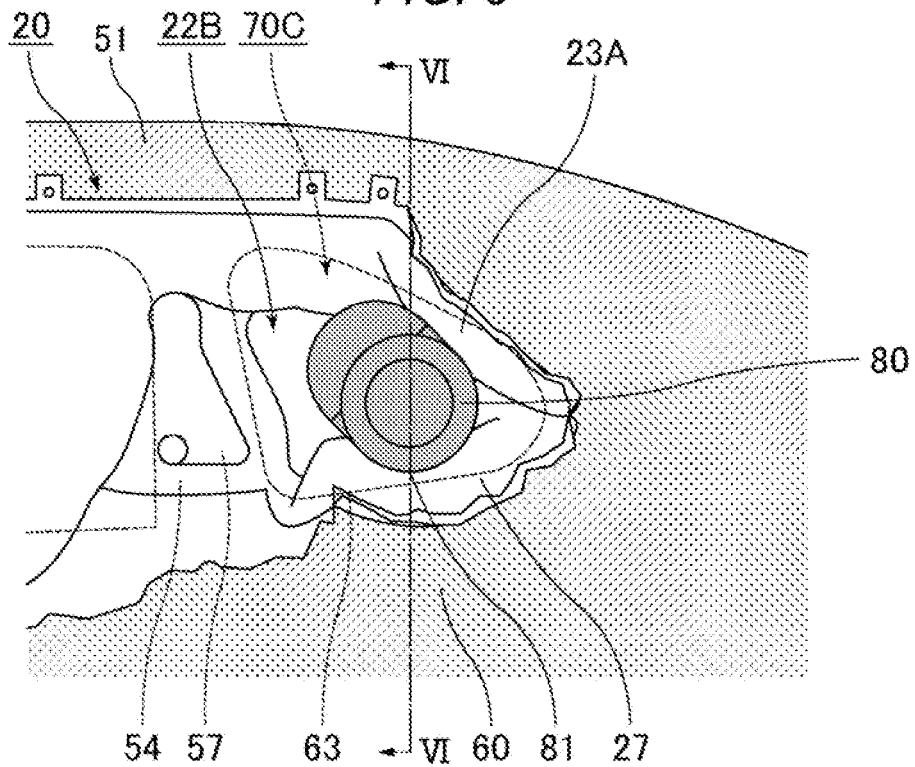
FIG. 5 schematically illustrates an inflated and deployed state of the airbag, when the impactor strikes, included in the curtain airbag device in FIG. 1 in the vehicle rear portion, and is a front view of the vehicle side wall from the vehicle interior side.
Figure 6:
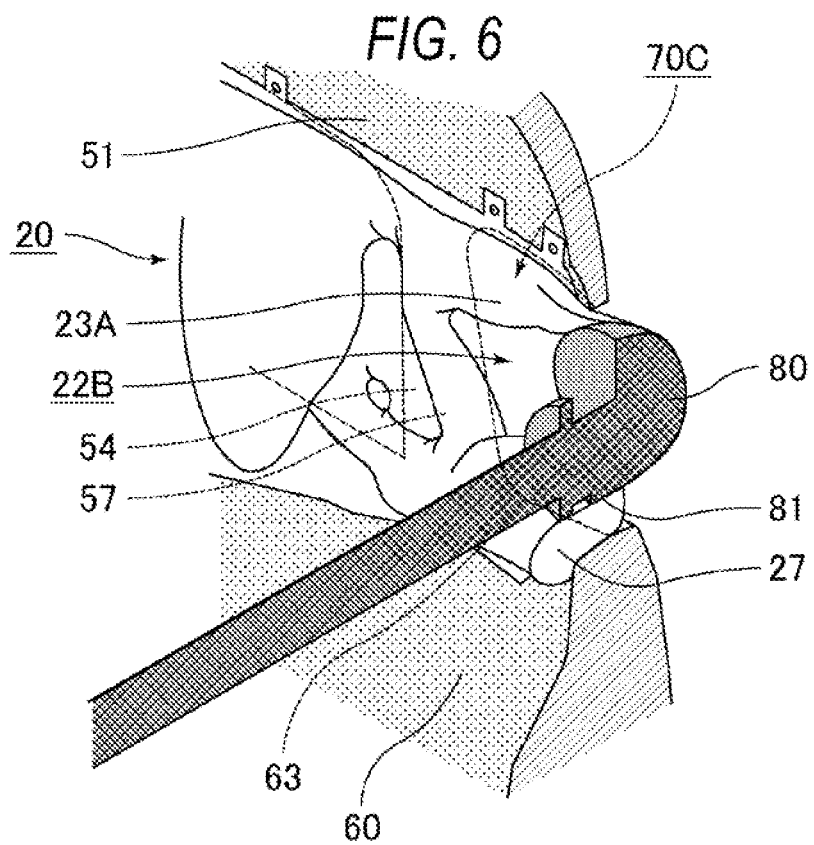
FIG. 6 is a view schematically illustrating a cross-section of the curtain airbag device taken along line VI-VI in FIG. 5, and is a perspective view of the vehicle side wall from the vehicle interior side.

FIG. 5 schematically illustrates an inflated and deployed state of the airbag, when the impactor strikes, included in the curtain airbag device in FIG. 1 in the vehicle rear portion, and is a front view of the vehicle side wall from the vehicle interior side. FIG. 6 is a view schematically illustrating a cross-section of the curtain airbag device taken along line VI-VI in FIG. 5, and is a perspective view of the vehicle side wall from the vehicle interior side. FIG. 5 and FIG. 6 illustrate a state in which an impactor 80 is most protruded to a vehicle exterior side after the airbag 20 is inflated and deployed.

In the present embodiment, as illustrated in FIG. 5 and FIG. 6, when the impactor 80 strikes the opening 70C located at the endmost, the impactor 80 comes into contact with the non-inflation region 22B, and a lower inflation portion 27 of the inflation portion 23A located on the vehicle lower side of the non-inflation region 22B is sandwiched between a lower end 81, which is an end located below in the vehicle vertical direction, of the impactor 80 and the interior material of the vehicle side portion. Specifically, here, the interior material is the trunk side trim 60. Accordingly, the impactor 80, that is, the occupant, can be prevented from being ejected to a vehicle exterior while reducing a capacity of the airbag 20.

More specifically, when the impactor 80 strikes the opening 70C, the impactor 80 comes into contact with the non-inflation region 22B of the airbag 20 after completion of inflation and deployment, and the airbag 20 is pushed out further toward the vehicle exterior side than the opening 70C by entry of the impactor 80. At this time, the lower inflation portion 27 located on the vehicle lower side of the non-inflation region 22B is sandwiched between the impactor 80 and the trunk side trim 60, which is the interior material of the vehicle side portion, and movement of the lower inflation portion 27 toward the vehicle exterior side is restricted. In conjunction with this, the non-inflation region 22B located on the vehicle upper side of the lower inflation portion 27 is also restricted from moving toward the vehicle exterior side. Thereafter, the impactor 80 is pushed back toward the vehicle interior side by a reaction force generated by the inflation portion 23A, which surrounds the non-inflation region 22B, and the airbag 20 coming into contact with the vehicle side wall. As described above, vehicle exterior ejection prevention performance can be exhibited while reducing the capacity of the airbag 20, by the non-inflation region 22B.

When the impactor 80 strikes the opening 70C, at least a central portion of the impactor 80, which is a portion that most protrudes in a vehicle exterior direction, comes into contact with the non-inflation region 22B.

A test of the vehicle exterior ejection prevention performance by the impactor 80 is conducted based on a vehicle rollover test to the vehicle that is specified in a regulation of United States (FMVSS 226), which requires prevention of the occupant from being ejected to the vehicle exterior. More specifically, evaluation of the regulation is conducted based on a test using an impactor, and it is required that an impactor (head impactor) imitating a head of an occupant is shot toward a vehicle exterior at a predetermined timing (here, after 1.5 seconds) after the curtain airbag device is activated at a predetermined speed (here, a legal speed 20 km/hour with a margin taken into account), and that an ejection amount of the impactor to the vehicle exterior is 100 mm or less. An impact point of the impactor is set at a predetermined position, based on a shape of an opening (here, opening 70C) which the impactor strikes. In a case where the impactor in a state of being vertically placed does not pass through the opening, which the impactor strikes, the impactor is rotated by 5° at a time until the impactor falls within the opening. In the present embodiment, a top portion of the impactor 80 is rotated toward the vehicle front side by 5° at a time. The impactor 80 has a vertically long elliptical shape of 226.1 mm in length and 176.8 mm in width.

Figure 7:
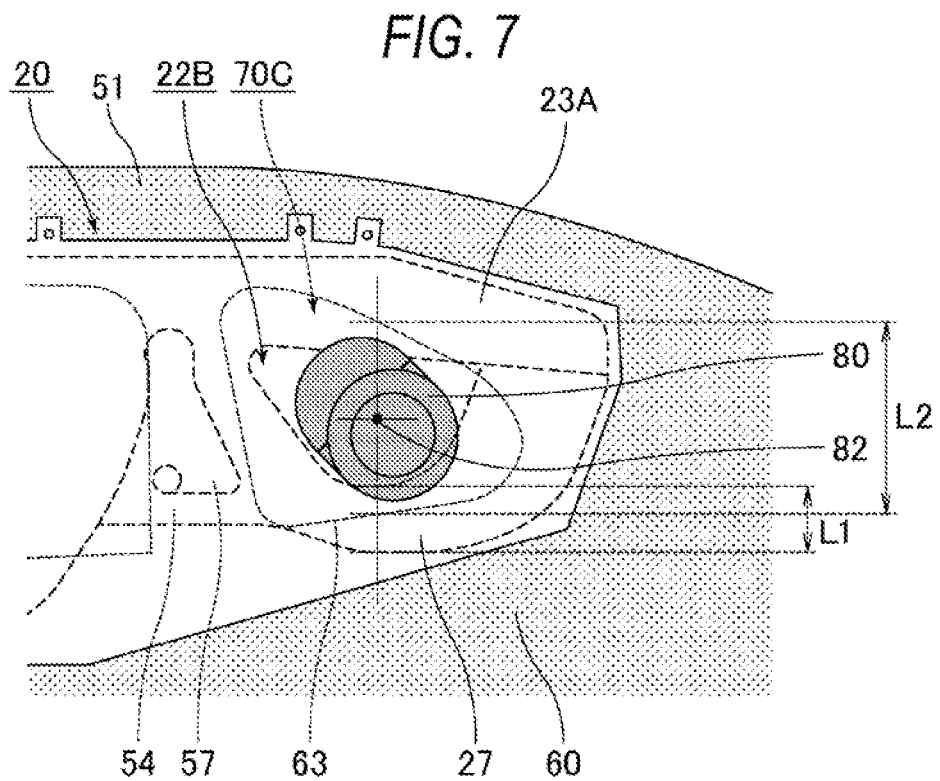
FIG. 7 schematically illustrates a deployed state of the airbag, before the impactor strikes, included in the curtain airbag device in FIG. 1 in the vehicle rear portion, and is a front view of the vehicle side wall from the vehicle interior side.

FIG. 7 schematically illustrates a deployed state of the airbag, before the impactor strikes, included in the curtain airbag device in FIG. 1 in the vehicle rear portion, and is a front view of the vehicle side wall from the vehicle interior side. FIG. 7 illustrates a state in which the airbag 20 is deployed without being inflated.

In the present embodiment, as illustrated in FIG. 7, in the deployed state of the airbag 20, which is a state in which the airbag 20 is deployed without being inflated, a length L1, in the vehicle vertical direction, of the lower inflation portion 27 of the inflation portion 23A located on the vehicle lower side of the non-inflation region 22B is 15% or more of a length L2, in the vehicle vertical direction, of the opening 70C located at the endmost. Accordingly, the impactor 80, that is, the occupant, can be prevented from being ejected to the vehicle exterior while reducing the capacity of the airbag 20.

More specifically, when the impactor 80 strikes the opening 70C, the impactor 80 comes into contact with the non-inflation region 22B of the airbag 20 after completion of inflation and deployment, and the airbag 20 is pushed out further toward the vehicle exterior side than the opening 70C by entry of the impactor 80. At this time, in a case where the length L1, in the vehicle vertical direction, of the lower inflation portion 27 is 15% or more of the length L2, in the vehicle vertical direction, of the opening 70C, the lower inflation portion 27 can be sandwiched between the impactor 80 and the trunk side trim 60, which is the interior material of the vehicle side portion, to restrict the movement of the lower inflation portion 27 toward the vehicle exterior side. Therefore, similarly to the case described above, the non-inflation region 22B is also restricted from moving toward the vehicle exterior side, and the impactor 80 is pushed back. Therefore, the vehicle exterior ejection prevention performance can be exhibited while reducing the capacity of the airbag 20, by the non-inflation region 22B.

Here, a value of 15% that is a lower limit of a ratio of the length L1 to the length L2 was calculated by performing a desk calculation for the length L1, which satisfies a requirement of the ejection amount of 100 mm or less required in FMVSS 226, based on a result of an evaluation test that was actually conducted using the curtain airbag device according to the present embodiment with the ejection amount strictly set to 70 mm or less. As a result, it was found that when the length L2 is 240 mm, the requirement of the ejection amount of 100 mm or less is satisfied if the length L1 is 33 mm or more.

Further, as illustrated in FIG. 7, the length L1 and the length L2 are measured on the same straight line passing through a center 82 of the impactor 80 in a state where the vehicle side wall is observed from the vehicle interior side in a direction parallel to a direction in which the impactor 80 strikes. The center 82 of the impactor 80 means a geometric center of a rounded rectangular (track-shaped) outline (outline of a head foam of the impactor 80) of the impactor 80.

The length L1 is preferably 41.7% or more of the length L2. The length L1 is preferably 81% or less of the length L2.

Figure 8:
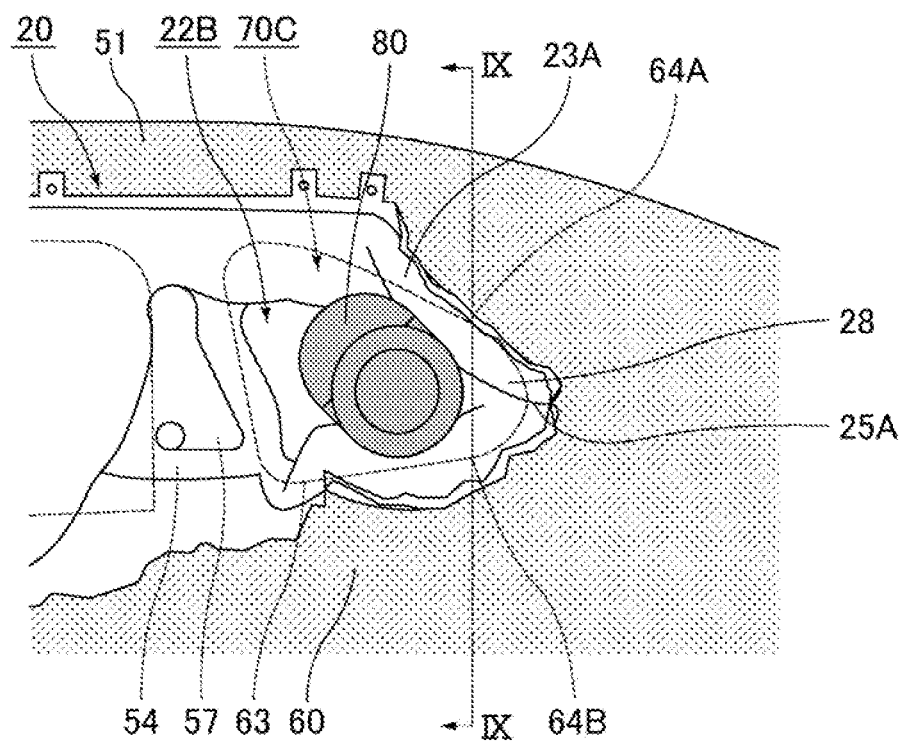
FIG. 8 schematically illustrates an inflated and deployed state of the airbag, when the impactor strikes, included in the curtain airbag device in FIG. 1 in the vehicle rear portion, and is a front view of the vehicle side wall from the vehicle interior side.
Figure 9:
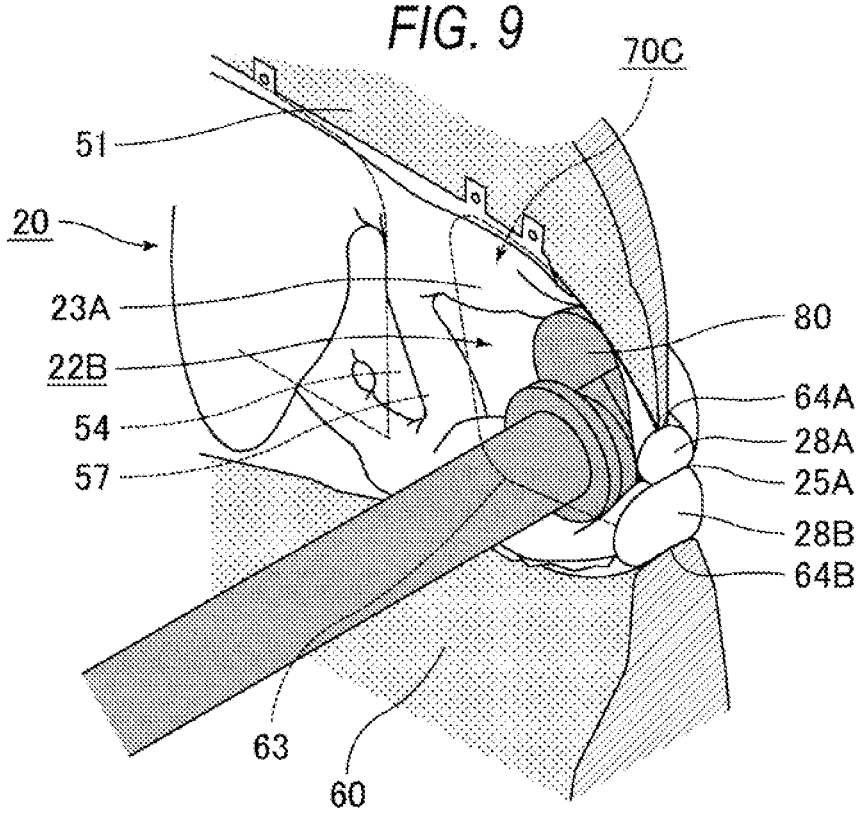
FIG. 9 is a view schematically illustrating a cross-section of the curtain airbag device taken along line IX-IX in FIG. 8, and is a perspective view of the vehicle side wall from the vehicle interior side.
Figure 10:
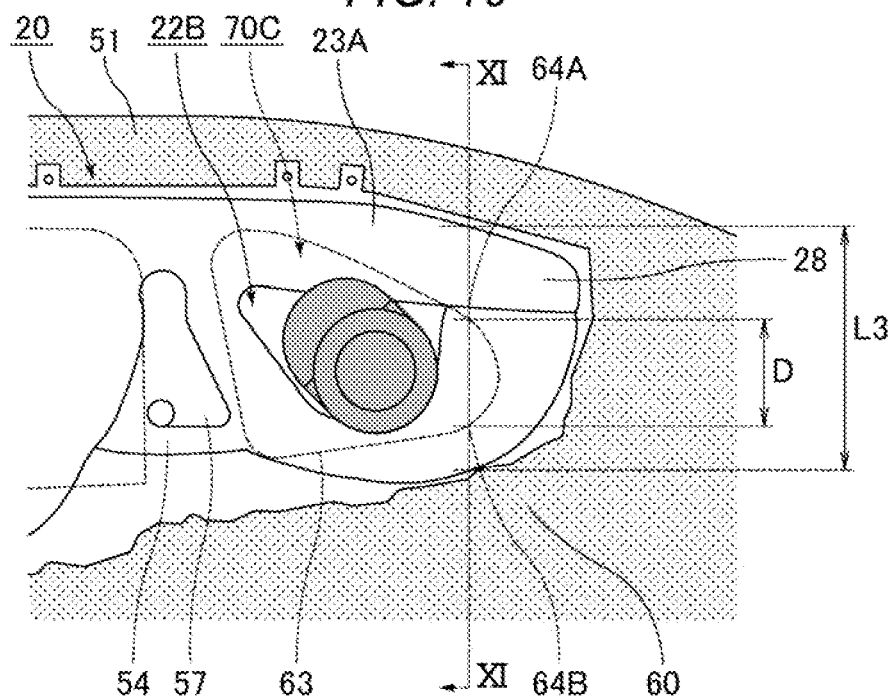
FIG. 10 schematically illustrates an inflated and deployed state of the airbag, before the impactor strikes, included in the curtain airbag device in FIG. 1 in the vehicle rear portion, and is a front view of the vehicle side wall from the vehicle interior side.
Figure 11:
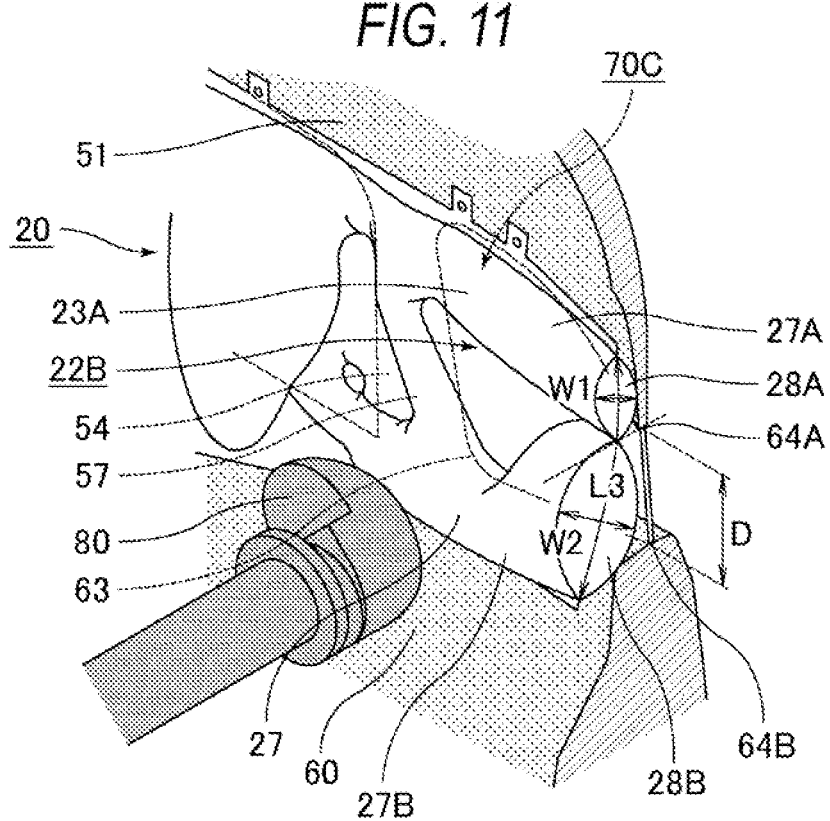
FIG. 11 is a view schematically illustrating a cross-section of the curtain airbag device taken along line XI-XI in FIG. 10, and is a perspective view of the vehicle side wall from the vehicle interior side.

FIG. 8 schematically illustrates an inflated and deployed state of the airbag, when the impactor strikes, included in the curtain airbag device in FIG. 1 in the vehicle rear portion, and is a front view of the vehicle side wall from the vehicle interior side. FIG. 9 is a view schematically illustrating a cross-section of the curtain airbag device taken along line IX-IX in FIG. 8, and is a perspective view of the vehicle side wall from the vehicle interior side. FIG. 10 schematically illustrates an inflated and deployed state of the airbag, before the impactor strikes, included in the curtain airbag device in FIG. 1 in the vehicle rear portion, and is a front view of the vehicle side wall from the vehicle interior side. FIG. 11 is a view schematically illustrating a cross-section of the curtain airbag device taken along line XI-XI in FIG. 10, and is a perspective view of the vehicle side wall from the vehicle interior side. FIG. 8 and FIG. 9 illustrate a state where the impactor 80 protrudes most toward the vehicle exterior side after the airbag 20 is inflated and deployed. FIG. 10 and FIG. 11 illustrate a state where after the airbag 20 is inflated and deployed and before the impactor 80 comes into contact with the airbag 20. FIG. 8 illustrates the same state as FIG. 5.

Further, in the present embodiment, as illustrated in FIG. 8 and FIG. 9, when the impactor 80 strikes the opening 70C located at the endmost, the inflation portion 23A includes, in a side closer to an end side than the non-inflation region 22B, a stopper portion 28, which is bent and sandwiched between opposing edge portions 64A and 64B of the interior materials in the vehicle vertical direction. Here, the end side is a rear end side than the non-inflation region 22B. That is, when the impactor 80 strikes the opening 70C, the stopper portion 28 bends in the vehicle vertical direction, and is sandwiched between the edge portions 64A and 64B in a bent state. More specifically, the stopper portion 28 is bent toward the vehicle interior side, at a bending line in the vehicle front-rear direction. The rear end side means an end side located at the rear of the vehicle. The edge portion 64A corresponds to an edge portion of the trunk side trim 60 that is located on a vehicle upper side of the opening 70C. The edge portion 64B corresponds to an edge portion of the trunk side trim 60 that is located on a vehicle lower side of the opening 70C.

As illustrated in FIG. 10 and FIG. 11, in a state where the airbag 20 is inflated and deployed and before the impactor 80 strikes the opening 70C, a length L3, in the vehicle vertical direction, of the stopper portion 28 is longer than a distance D, in the vehicle vertical direction, between the opposing edge portions 64A and 64B of the interior materials. Accordingly, the impactor 80, that is, the occupant, can be prevented from being ejected to the vehicle exterior while reducing the capacity of the airbag 20.

More specifically, the stopper portion 28 is bent by the impactor 80 moving the non-inflation region 22B toward the vehicle exterior side, and the stopper portion 28 is sandwiched between the opposing edge portions 64A and 64B of the interior materials since the length L3, in the vehicle vertical direction, of the stopper portion 28 is longer than the distance D between the opposing edge portions 64A and 64B of the interior materials. Therefore, movement of the airbag 20 to the vehicle exterior side is restricted, and as a result, movement of the non-inflation region 22B and the impactor 80 that comes into contact with the non-inflation region 22B is restricted. Thereafter, the bent stopper portion 28 returns to an original state thereof, and thus the non-inflation region 22B and the impactor 80 that comes into contact with the non-inflation region 22B are pushed back toward the vehicle interior side. That is, the vehicle exterior ejection prevention performance can be exhibited while reducing the capacity of the airbag 20, by the non-inflation region 22B.

Although both the length L3 and the distance D may change in the vehicle front-rear direction, the length L3 being longer than the distance D means that this relation is satisfied at any position in the vehicle front-rear direction.

Further, as illustrated in FIG. 11, the length L3 and the distance D are compared with each other on the same cross-section orthogonal to the vehicle front-rear direction.

A ratio of the length L3 to the distance D is not particularly limited as long as the ratio exceeds 100%, and is preferably 200% or more.

Further, as illustrated in FIG. 11, in the state where the airbag 20 is inflated and deployed and before the impactor 80 strikes the opening 70C, a sum (W1+W2) of a thickness W1, in the vehicle width direction, of an upper portion 28A of the stopper portion 28 and a thickness W2, in the vehicle width direction, of the lower portion 28B of the stopper portion 28 is preferably longer than the distance D, in the vehicle vertical direction, between the opposing edge portions 64A and 64B of the interior materials. As illustrated in FIG. 9, when the impactor 80 strikes, the upper portion 28A and the lower portion 28B of the stopper portion 28 rotate about the bending line, and a thickness direction of the upper portion 28A and the lower portion 28B of the stopper portion 28 is oriented in the vehicle vertical direction. Therefore, by making the sum (W1+W2) of the thickness W1 and the thickness W2 longer than the distance D, the stopper portion 28 is more reliably sandwiched by the edge portions 64A and 64B. As a result, movements, toward the vehicle exterior side, of the non-inflation region 22B and the impactor 80 that comes into contact with the non-inflation region 22B are more effectively restricted.

The upper portion 28A of the stopper portion 28 is a portion of the stopper portion 28 located on a vehicle upper side of the bending line. The lower portion 28B of the stopper portion 28 is a portion of the stopper portion 28 located on a vehicle lower side of the bending line.

Although both the thicknesses W1 and W2 and the distance D may change in the vehicle front-rear direction, the sum (W1+W2) of the thicknesses W1 and W2 being longer than the distance D means that this relation is satisfied at any position in the vehicle front-rear direction.

Further, as illustrated in FIG. 11, the sum (W1+W2) of the thickness W1 and the thickness W2 and the distance D are compared with each other on the same cross-section orthogonal to the vehicle front-rear direction.

A ratio of the sum (W1+W2) of the thickness W1 and the thickness W2 to the distance D is not particularly limited as long as the ratio exceeds 100%, and is preferably 138% or more.

Further, as illustrated in FIG. 8 and FIG. 9, it is preferable that the inflation portion 23A includes a joint portion 25A that partitions the stopper portion 28, and the stopper portion 28 is bent at the joint portion 25A. Accordingly, in a case where the non-inflation region 22B is moved to the vehicle exterior side by the impactor 80, the stopper portion 28 can be easily and reliably bent. The joint portion 25A is preferably provided linearly in the vehicle front-rear direction.

As described above, according to the present embodiment, the movement of the impactor 80 can be restricted even in a case where the non-inflation region 22B that comes into contact with the impactor 80 is provided, so that the vehicle exterior ejection prevention performance can be exhibited while reducing the capacity of the airbag 20. Further, since the impactor 80 is received by the non-inflation region 22B, the impactor 80 is less likely to slip on a surface of the airbag 20 and can be stably received.

In the above description, a case has been described in which (1) when the impactor 80 strikes the opening 70C, the lower inflation portion 27 is sandwiched between the lower end 81 of the impactor 80 and the interior materials of the vehicle side portion, (2) in the deployed state of the airbag 20, the length L1, in the vehicle vertical direction, of the lower inflation portion 27 is 15% or more of the length L2, in the vehicle vertical direction, of the opening 70C, and (3) when the impactor 80 strikes the opening 70C, the inflation portion 23A includes, in a side closer to the end side than the non-inflation region 22B, the stopper portion 28 that is bent and sandwiched between the opposing edge portions 64A and 64B of the interior materials in the vehicle vertical direction, and in a state where the airbag 20 is inflated and deployed and before the impactor 80 is driven into the opening 70C, the length L3, in the vehicle vertical direction, of the stopper portion 28 is longer than the distance D, in the vehicle vertical direction, between the opposing edge portions 64A and 64B of the interior materials. The curtain airbag device 1 may satisfy at least one of the features (1) to (3). However, from a viewpoint of improving the vehicle exterior ejection prevention performance, it is preferable to satisfy at least two features of (1) to (3), and more preferable to satisfy all the features of (1) to (3).

Further, in the above description, although a case has been described in which the non-inflation region 22B covers a part of the opening 70C located at the rearmost end in the vehicle longitudinal direction, among the plurality of openings 70A, 70B, and 70C, in the present disclosure, the non-inflation region may cover a part of the opening located at a frontmost end in the vehicle longitudinal direction among the plurality of openings, and has a size through which the head of the occupant passes.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A curtain airbag device to be attached to a roof side rail of a vehicle, and to be inflated and deployed to cover three openings partitioned by the roof side rail and interior materials of a vehicle side portion, the curtain airbag device comprising:
   an inflator configured to generate gas;
   an airbag including, on one end side in a vehicle front-rear direction:
      an inflation portion configured to be inflated by the gas;
      a non-inflation region into which the gas does not flow, the non-inflation region having a two-dimensional shape when viewed from a vehicle interior side formed by a plurality of sides surrounding the non-inflation region such that an inflation capacity of the airbag device is reduced; and
   at least one fixing member located on an upper portion of the airbag, the fixing member being configured to fix the airbag to the roof side rail,
   wherein, in a state where the airbag is inflated and deployed, the non-inflation region covers a part of an endmost opening among the three openings, and the inflation portion is disposed to surround the non-inflation region, the endmost opening being the opening of the three openings located closest to an end of the vehicle in a vehicle longitudinal direction,
   two sides of the plurality of sides surrounding the non-inflation region are longer than 176.8 mm;
   the inflation portion surrounds the non-inflation region, and the inflation portion includes a lower inflation portion located directly below the non-inflation region; and in a case where an impactor strikes the endmost opening, the impactor comes into contact with the non-inflation region, and the lower inflation portion of the inflation portion is sandwiched between a lower end of the impactor and the interior materials of the vehicle side portion.

2. The curtain airbag device according to claim 1, wherein the airbag further comprises
an outer peripheral joint portion defining a part of an outer edge shape of the inflation portion; and
an inner side joint portion connecting the outer peripheral joint portion and the non-inflation region,
wherein the inner side joint portion connects a portion of the outer peripheral joint portion located closest to the end of the vehicle in the vehicle longitudinal direction and the non-inflation region.

3. A curtain airbag device to be attached to a roof side rail of a vehicle, and to be inflated and deployed to cover a three openings partitioned by the roof side rail and interior materials of a vehicle side portion, the curtain airbag device comprising:
an inflator configured to generate gas;
an airbag including, on one end side in a vehicle front-rear direction:
an inflation portion configured to be inflated by the gas;
a non-inflation region into which the gas does not flow, the non-inflation region having a two-dimensional shape when viewed from a vehicle interior side formed by a plurality of sides surrounding the non-inflation region such that an inflation capacity of the airbag device is reduced; and
at least one fixing member located on an upper portion of the airbag, the fixing member being configured to fix the airbag to the roof side rail,
wherein, in a state where the airbag is inflated and deployed, the non-inflation region covers a part of an endmost opening among the three openings, and the inflation portion is disposed to surround the non-inflation region, the endmost opening being the opening of the three openings located closest to an end of the vehicle in a vehicle longitudinal direction,
two sides of the plurality of sides surrounding the non-inflation region are longer than 176.8 mm; and
in a case where an impactor strikes the endmost opening, the impactor comes into contact with the non-inflation region, and
in a state where the airbag is deployed and is not inflated, a length, in a vehicle vertical direction, of the lower inflation portion of the inflation portion is 15% or more of a length, in the vehicle vertical direction, of the endmost opening.

4. The curtain airbag device according to claim 3, wherein the airbag further comprises
an outer peripheral joint portion defining a part of an outer edge shape of the inflation portion; and
an inner side joint portion connecting the outer peripheral joint portion and the non-inflation region,
wherein the inner side joint portion connects a portion of the outer peripheral joint portion located closest to the end of the vehicle in the vehicle longitudinal direction and the non-inflation region.

5. A curtain airbag device to be attached to a roof side rail of a vehicle, and to be inflated and deployed to cover three openings partitioned by the roof side rail and interior materials of a vehicle side portion, the curtain airbag device comprising:
an inflator configured to generate gas;
an airbag including, on one end side in a vehicle front-rear direction:
an inflation portion configured to be inflated by the gas;
a non-inflation region into which the gas does not flow, the non-inflation region having a two-dimensional shape when viewed from a vehicle interior side formed by a plurality of sides surrounding the non-inflation region such that an inflation capacity of the airbag device is reduced; and
at least one fixing member located on an upper portion of the airbag, the fixing member being configured to fix the airbag to the roof side rail,
wherein, in a state where the airbag inflates and deploys, the non-inflation region covers a part of an endmost opening among the three openings, and the inflation portion is disposed to surround the non-inflation region, the endmost opening being the opening of the three openings located closest to an end of the vehicle in a vehicle longitudinal direction,
two sides of the plurality of sides surrounding the non-inflation region are longer than 176.8 mm;
the inflation portion surrounds the non-inflation region; and the inflation portion includes a lower inflation portion located directly below the non-inflation region
in a case where an impactor strikes the endmost opening, the impactor comes into contact with the non-inflation region, and the inflation portion includes, closer to an end than the non-inflation region, a stopper portion bent and sandwiched between opposing edge portions, in a vehicle vertical direction, of the interior materials, and
in a state where the airbag is inflated and deployed and before the impactor strikes, a length, in the vehicle vertical direction, of the stopper portion is longer than a distance, in the vehicle vertical direction, between the opposing edge portions of the interior materials.

6. The curtain airbag device according to claim 5, wherein in the state where the airbag is inflated and deployed and before the impactor strikes, a sum of a thickness, in a vehicle width direction, of an upper portion of the stopper portion and a thickness, in the vehicle width direction, of a lower portion of the stopper portion is longer than the distance, in the vehicle vertical direction, between the opposing edge portions of the interior materials.

7. The curtain airbag device according to claim 5, wherein the inflation portion includes a joint portion that partitions the stopper portion, and
the stopper portion is bent at the joint portion.

8. The curtain airbag device according to claim 5, wherein the airbag further comprises
an outer peripheral joint portion defining a part of an outer edge shape of the inflation portion; and
an inner side joint portion connecting the outer peripheral joint portion and the non-inflation region,
wherein the inner side joint portion connects a portion of the outer peripheral joint portion located closest to the end of the vehicle in the vehicle longitudinal direction and the non-inflation region.

* * * * *